United States Patent [19]

Hoffer

[11] Patent Number: 5,577,151
[45] Date of Patent: Nov. 19, 1996

[54] OPTICAL FIBER SPLICE TRAY AND COVER

[75] Inventor: John C. Hoffer, Harrisburg, Pa.

[73] Assignee: The Whitaker Corporation, Wilmington, Del.

[21] Appl. No.: 515,443

[22] Filed: Aug. 15, 1995

[51] Int. Cl.[6] ........................................... G02B 6/36
[52] U.S. Cl. ................................. 385/135; 385/134
[58] Field of Search .............................. 385/95, 97, 98, 385/99, 134, 135, 136, 137, 139

[56] References Cited

U.S. PATENT DOCUMENTS

| | | | |
|---|---|---|---|
| 4,266,853 | 5/1981 | Hutchins et al. | 385/135 X |
| 4,359,262 | 11/1982 | Dolan | 385/135 X |
| 4,500,166 | 2/1985 | Kunze | 385/135 X |
| 4,627,686 | 12/1986 | Szentesi | 385/135 X |
| 4,679,896 | 7/1987 | Krafcik et al. | 385/135 X |
| 4,687,289 | 8/1987 | DeSanti | 385/135 X |
| 4,702,551 | 10/1987 | Coulombe | 385/135 X |
| 4,793,682 | 12/1988 | Cooper | 385/135 X |
| 4,799,757 | 1/1989 | Goetter | 385/135 X |
| 4,812,004 | 3/1989 | Biederstedt et al. | 385/135 X |
| 4,840,449 | 6/1989 | Gnandeharizadeh | 385/135 X |
| 4,958,903 | 9/1990 | Cobb et al. | 385/135 X |
| 5,005,941 | 4/1991 | Barlow et al. | 385/135 X |
| 5,067,784 | 11/1991 | Debortoli et al. | 385/53 |
| 5,071,211 | 12/1991 | Debortoli et al. | 385/135 X |
| 5,090,792 | 2/1992 | Koht et al. | 385/32 |
| 5,119,459 | 6/1992 | Meyerhoefer et al. | 385/135 |
| 5,127,082 | 6/1992 | Below et al. | 385/135 |
| 5,131,066 | 7/1992 | Foss | 385/135 |
| 5,167,001 | 11/1992 | Debortoli et al. | 385/135 |
| 5,185,825 | 2/1993 | Jones | 385/845 |
| 5,189,725 | 2/1993 | Bensel, III et al. | 385/135 |
| 5,222,183 | 6/1993 | Daems et al. | 385/135 |
| 5,222,184 | 6/1993 | Foss | 385/135 |
| 5,241,617 | 8/1993 | Peacock et al. | 385/135 |
| 5,278,933 | 1/1994 | Hunsinger et al. | 385/135 |
| 5,285,515 | 2/1994 | Milanowski et al. | 385/135 |
| 5,323,478 | 6/1994 | Milanowski et al. | 385/135 |
| 5,375,185 | 12/1994 | Hermsen et al. | 385/135 |
| 5,420,956 | 5/1995 | Grugel et al. | 385/135 |
| 5,420,957 | 5/1995 | Burek et al. | 385/135 |
| 5,422,974 | 6/1995 | Brown et al. | 385/135 |

OTHER PUBLICATIONS

*AMP Catalog 82188*, "AMP Fiber Optic Products", p. 147; Feb. 1993; AMP Incorporated, Harrisburg, PA.

*AMP Instruction Sheet* 408–9490, "AMP Organizer Holder Kits and Tray", five pages; Mar., 1993; AMP Incorporated, Harrisburg, PA.

*BEJED Drawing*, "BJ–1742C–005 12 Fiber Universal Splice Unit", Feb., 1994; BEJED Communication Products, Portland, OR.

*Siecor Catalog*, "Splice Trays", (date unknown); pp. 2–65 to 2–68; Siecor Corporation, Hickory, North Carolina.

*Primary Examiner*—Brian Healy
*Attorney, Agent, or Firm*—Anton P. Ness

[57] ABSTRACT

A splice tray assembly (20) including a tray member (22) and a planar cover member (24). Side walls (34,36) of the tray include proximate each end (28,30) a tray tab (40) extending above top edges of the side walls and including an inwardly directed retainer section (44) spaced above the side wall top edges. The cover (24) includes cooperating retainer sections (56) to underlie the tray retainer sections (44) while side edge portions (58,60) of the cover rest atop the top edges of the tray side walls, for cover retention. The cover further includes deflectable portions or cover tabs (70,72) inwardly from a respective end to be positioned inwardly of the tray tabs (40), with either of the cover tabs being upwardly deflectable enabling it to pass over the tray retention section of the adjacent tray tab during cover assembly and removal.

11 Claims, 5 Drawing Sheets

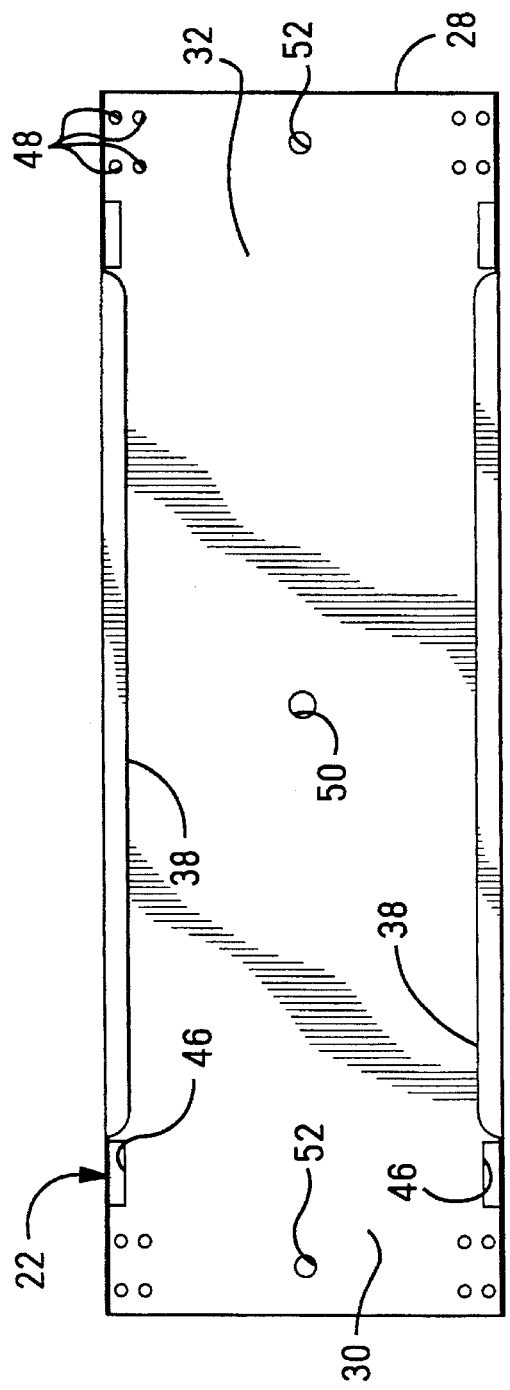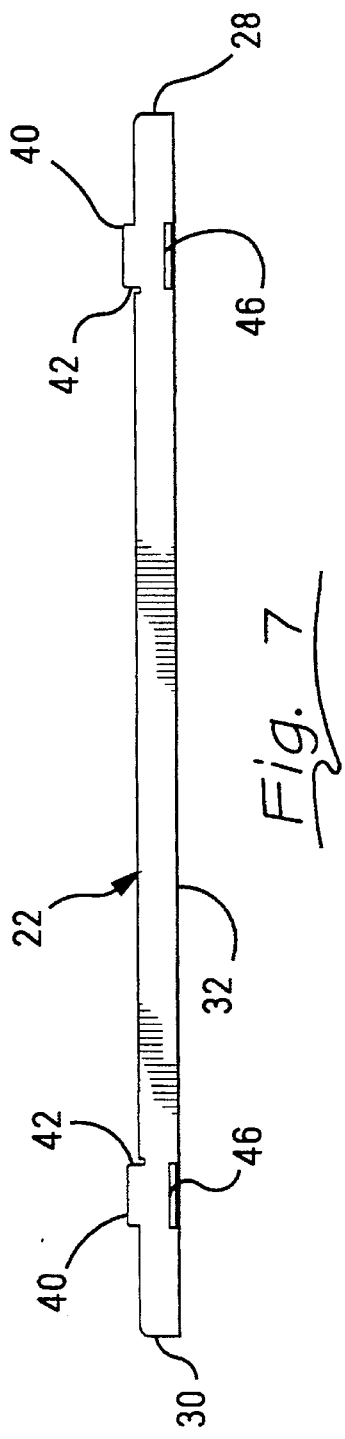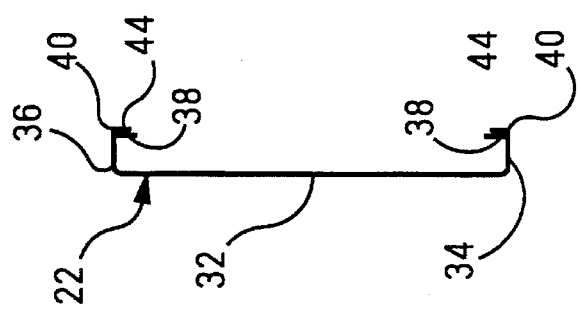

OPTICAL FIBER SPLICE TRAY AND COVER

FIELD OF THE INVENTION

The present invention relates to the field of optical fiber interconnection and more particularly to splice trays therefor.

BACKGROUND OF THE INVENTION

In multiple fiber interconnection arrangements, a plurality of pairs of associated optical fibers are to be interconnected and such interconnections must thereafter be held securely and carefully, usually in an organizer tray or cassette within a larger enclosure or cabinet, and usually in an array of such trays or cassettes. Splice trays must also hold generous portions of the fibers adjacent the interconnections, or splices, to permit splice repair without requiring cable replacement. Preferably the trays are flat and of low height to be conveniently stacked in array thereof, and further include a cover that is preferably transparent to enable visual inspection of the splice interconnections. Such a cover must be easily secured to the tray in a manner permitting it to be easily removed from the tray for repair or servicing. In one manner of cover securement, the cover is of resilient material and includes side walls that are angled toward each other and are latchable about the side walls of the tray proper, being slightly deflectable outwardly by bearing engagement with the tray side walls during cover assembly or removal.

One such splice tray is disclosed in U.S. patent application Ser. No. 08/453,303 filed May 30, 1995, pending, and assigned to the assignee hereof. The disclosed splice tray provides strain relief holders at each end having an array of slots into which portions of the optical fiber cables are inserted to be held securely but without substantial clamping of the fiber cables. Additionally, the optical interconnections of associated pairs of optical fibers of the cables are held in a generally centrally located slotted splice holder, again without substantial clamping of the fragile fibers. The disclosed splice tray is adapted for utilization with either single-fiber or multiple-fiber cylindrical cable or flat wide multiple-fiber ribbon cable.

It is desired to provide a tray cover that is planar, having no features requiring a forming step, and is securable to a tray without separate fasteners in a manner permitting easy removal when desired.

SUMMARY OF THE INVENTION

The tray member provides a tab along at least one side wall located adjacent an end of the tray, and preferably tabs on both side walls near each end, first protruding upwardly a slight distance above the upper or free side wall edge and including an inwardly directed retaining section at the tab end. Cooperating retaining sections of the cover underlie the tray tab retaining sections, preventing the cover from being lifted off. The tray cover includes along one or each side edge near but spaced from an end, a deflectable portion such as a tab. Extending inwardly from one side of each such deflectable portion adjacent an associated tray tab, and preferably both sides of a cover tab, is a slot, allowing the tab to define a cantilever beam manually deflectable upwardly a limited extent, with an end thereof preferably protruding slightly outwardly of the side of the tray to enable manual engagement.

The cover is adapted to be slid onto and off the tray from an end of the tray, or preferably, slid a fixed distance along the tray and thereafter lifted. During cover assembly and removal, the deflectable portion or cover tab is deflectable to ride over the tray tab while the side edge portions of the cover slide atop the tray side wall free edges and beneath the inwardly directed tray tab end. During assembly, the tray tab free end secures the planar cover adjacent the tray side wall free edges, and the cover tab resiles to rest within the plane of the cover after passing inwardly beyond the tray tab, a side edge of the cover tab adjacent the inner side edge of the tray tab defining cooperating stop surfaces maintaining the cover on the tray fixed against sliding. During removal, the cover tab is easily engageable manually to be deflected upwardly to again ride over the tray tab as the cover is slid off the tray end.

It is an objective of the present invention to provide a tray cover that is easily securable to a splice tray without separate fasteners, and in a manner permitting removal.

It is another objective to provide a tray cover that is planar and is fabricated simply such as by stamping to define cover features cooperable with the tray that are within the plane of the cover, thereby obviating any forming steps.

It is still another objective to provide the tray cover with at least one upwardly deflectable portion, such as a cover tab, that when undeflected cooperates with a tray tab to prevent sliding, and when deflected can ride over the tray tab to permit sliding of the cover relative to the tray.

It is yet another objective to provide the tray cover with features that permit lifting the cover off the tray after limited sliding.

An embodiment of the present invention will now be described by way of example with reference to the accompanying drawings.

BRIEF DESCRIPTION OF THE DRAWINGS

FIGS. 5, 6 and 7 are plan, side and end views of the splice tray of FIGS. 2 to 4.

DETAILED DESCRIPTION OF THE PREFERRED EMBODIMENT

Figure 1:
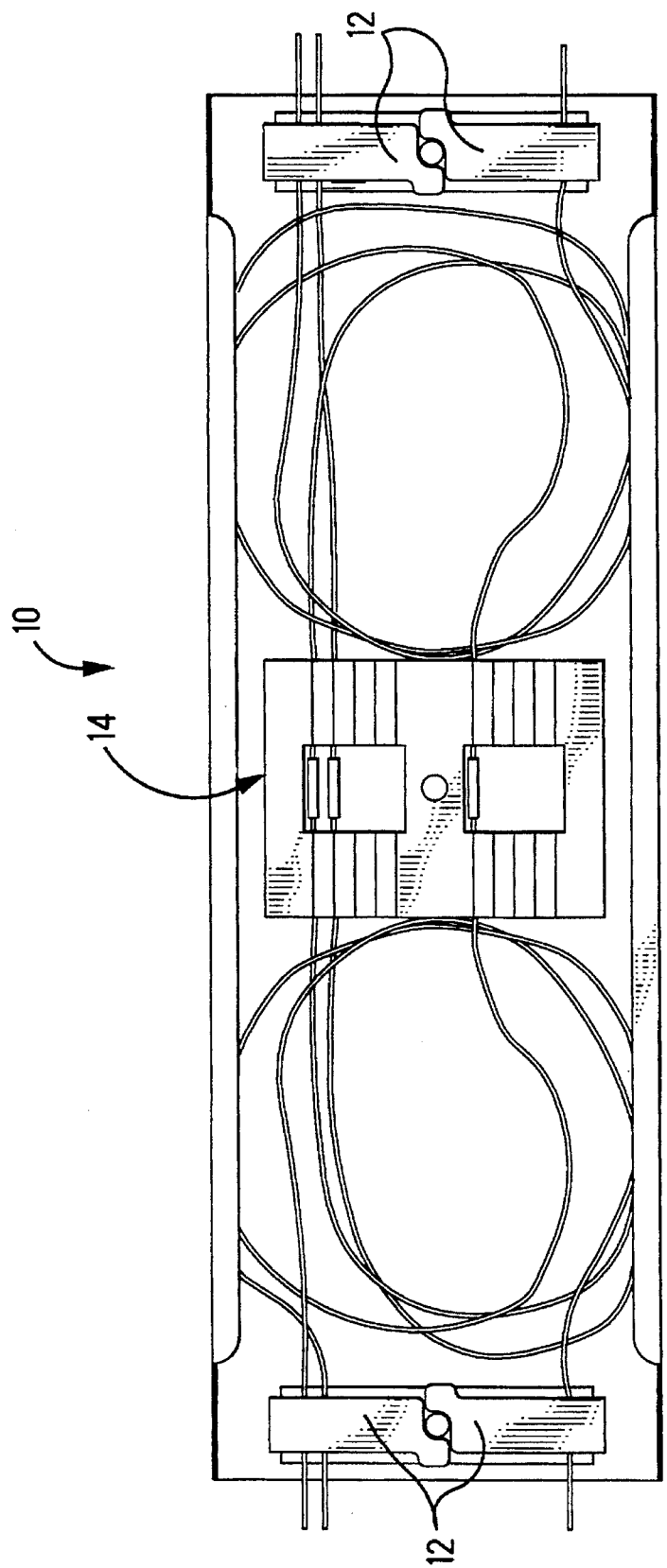
FIG. 1 is a plan view of a splice tray of the prior art.

In FIG. 1 a prior art splice tray 10 is shown having cable holders 12 adjacent each end and a splice holder 14 disposed intermediate the ends, with representative optical fiber cables shown contained in the splice tray. Such a splice tray is disclosed in U.S. patent application Ser. No. 08/453,303 filed May 30, 1995.

Figure 2:
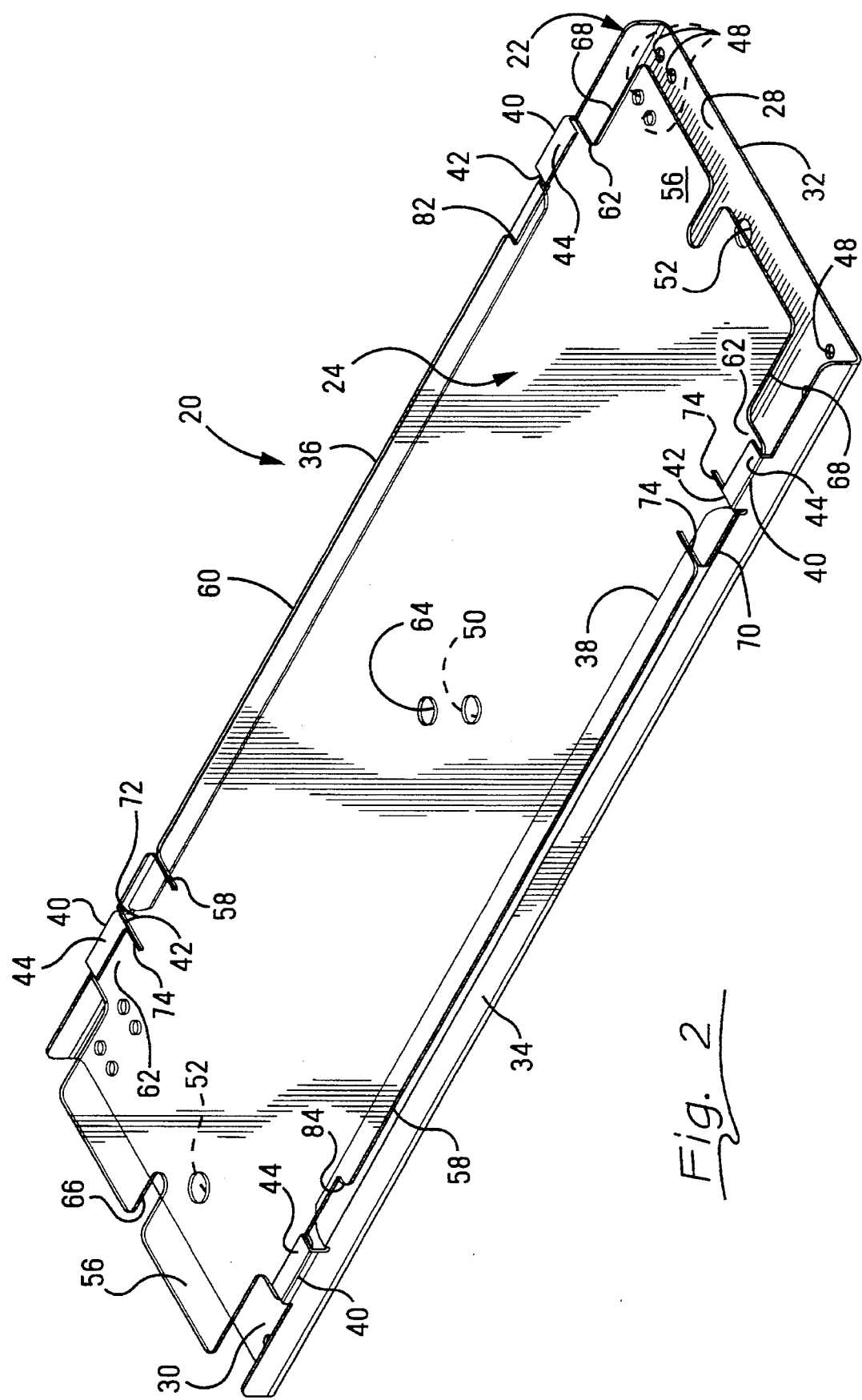
FIG. 2 is an isometric view of the assembly of the splice tray and cover of the present invention.
Figure 3:
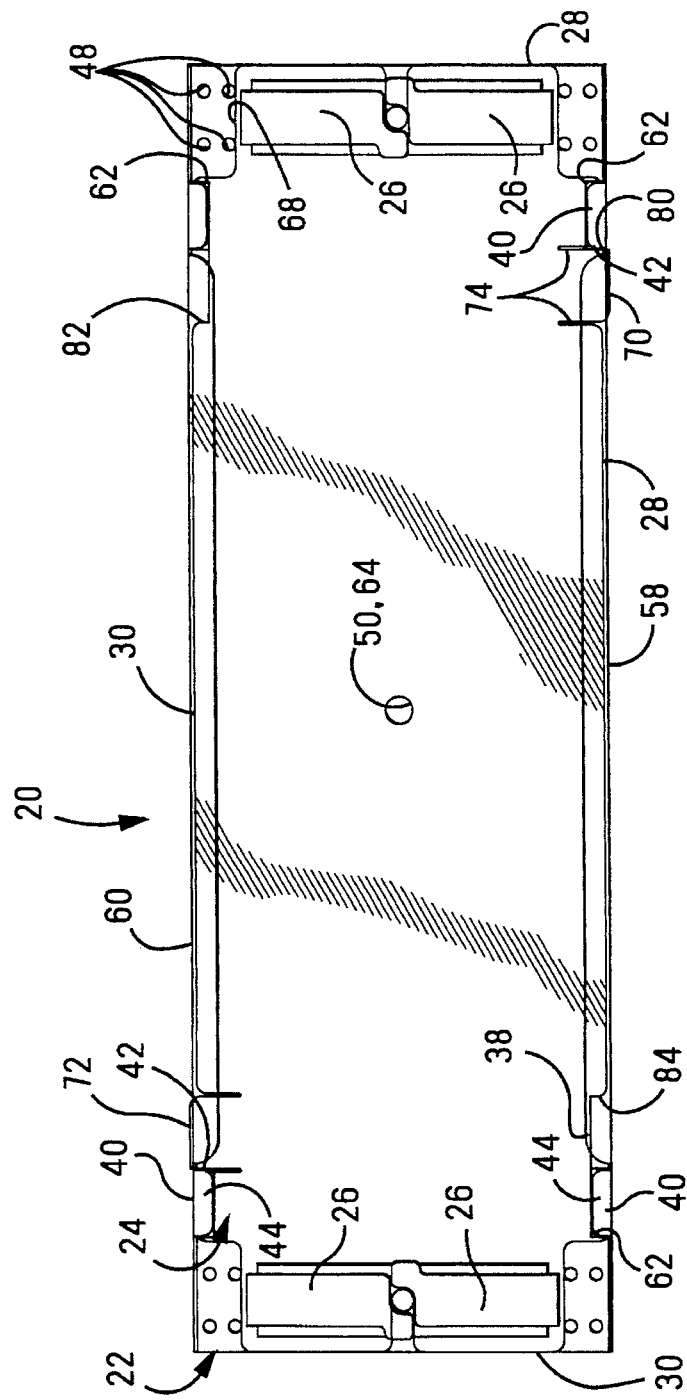
FIGS. 3 and 4 are plan and end views of the splice tray assembly of FIG. 2.
Figure 4:
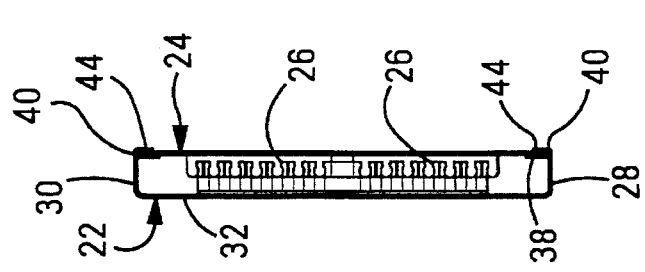

FIGS. 2 to 4 illustrate the present invention. Splice tray assembly 20 includes a tray member 22 and a cover member 24 affixed thereto; assembly 20 is simplified in that no optical cables are shown. In FIGS. 3 and 4 cable holders 26 similar to cable holders 12 of FIG. 1 are shown affixed at each end 28,30 of tray member 22 where openings between the tray and the cover are defined providing entrances for the optical fiber cables. Assembly 20 is seen to be flat and have a low profile facilitating stacking in a splice tray array.

In FIGS. 5 to 7, tray member 22 includes a bottom wall 32, with side walls 34,36 coextending therefrom. Flanges 38 extend inwardly from top edges of side walls 34,36 parallel to bottom wall 32 along the central portion of the tray, that will serve to contain portions of loops of the optical fibers during assembly of the fiber splice interconnections prior to and during placement of cover 24 thereonto. Adjacent each tray end 28,30 and along both side walls 34,36 are defined tray tabs 40 protruding slightly beyond top edges of side walls 34,36 and having side edges 42. Free ends of tray tabs 40 are bent to extend inwardly to define retainer sections 44 positioned higher than the upper surfaces of flanges 38, as seen best in FIG. 6, spaced thereabove a distance slightly greater than the thickness of cover member 24. Cutouts (FIG. 5) are provided in bottom wall 32 at the base of each tray tab 40 sufficient to receive thereinto the elevated retainer sections of a similar tray stacked thereunder. Several pairs of holes 48 are shown provided at each end 28,30 along each side wall 34,36 enabling fastening of cable ties (not shown) if desired to be utilized for securing larger fiber optic cables (not shown) extending through the end openings beside cable holders 26 (FIG. 3) Also seen are rod-receiving holes 50,52 through bottom wall 32 enabling stacks of tray assemblies to be secured onto stacking rods (not shown).

Figure 8:
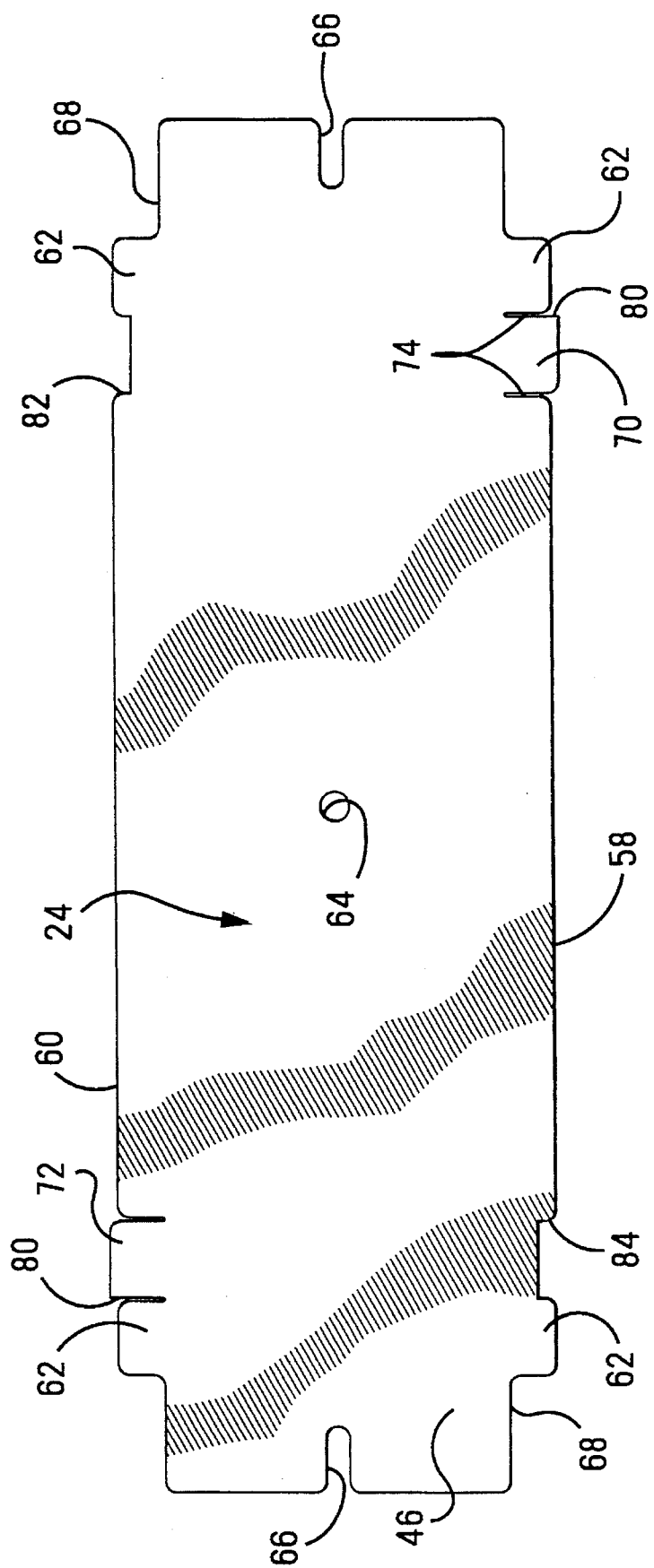
FIG. 8 is a plan view of the tray cover of FIGS. 2 to 4.

Cover member 24 is seen in FIG. 8, and is planar as seen best in FIGS. 2 and 4. End portions 56 are associated with tray ends 28,30 to enclose the cable entrances of the assembly above the cable holders. Side edge portions 58,60 will overlie flanges 38 of tray member 22. Proximate end portions 56 are cooperating retainer sections 62 that will underlie retainer sections 44 of tray tabs 40 while side edge portions 58,60 overlie flanges 38, an arrangement wherein cover member 24 is trapped between flanges 38 and retainer sections 44 to retain the cover member to the tray member. Rod-receiving openings 64,66 are provided corresponding to rod-receiving holes 50,52 of tray member 22. Cover cutouts 68 are provided beside end portions 62, associated with pairs of holes 48 of tray member 22, defining clearance for receipt thereinto of cable ties utilized on a similar tray stacked on top of tray assembly 20.

Cover tabs 70,72 are provided along side edges of cover member 24 spaced inwardly from cooperating retainer sections 62 of the cover member to reside inwardly of tray tabs 40 upon cover assembly and are easily manually engageable such as by protruding slightly beyond the side walls of the tray member as seen in FIGS. 2 and 3. In accordance with the present invention, cover tabs 70,72 define cantilever beams by reason of slots 74, with the slots extending sufficiently inwardly so that the cover tabs may be manually deflected upwardly sufficiently to rise above retainer sections 44 of tray tabs 40 during sliding of the cover member along tray member 22 during cover assembly or removal. By extending at least to the outer surface of tray side walls 34,36 while cooperating retainer sections 62 are recessed within the inner surface of tray tabs 40, end portions 76,78 of cover tabs 70,72 define side edges 80 adjacent inner side edges 42 of tray tabs 40 to abut thereagainst to restrain cover member 24 from inadvertent sliding with respect to tray member 22.

Recesses 82,84 are preferably formed in cover member 24 opposite the locations of cover tabs 70,72 permitting cover member 24 to be lifted off of tray member 22 as soon as cover member 24 is slid a sufficient distance to align a recess 82 or 84 with the retainer section 44 of the adjacent tray tab 40 opposite the location of corresponding cover tab 70 or 72. Optionally, only a single slot 74 extending to the interior of the cover member located adjacent one or each tray tab, will enable sufficient deflection of adjacent portions of the cover member thereat to ride over the tray tab thereat, especially if recesses 82,84 are provided requiring only a limited sliding prior to lifting of the cover member.

Cover member 24 thus can be fabricated by being cast in a planar sheet and stamped to define its dimensions and its features, all without any forming steps to bend portions thereof out of the plane, as in the prior art, and yet define features enabling retention to a tray member and also easy manual removal therefrom. The cover member is easily removable by being slid off either end of the tray member merely by upward deflection such as by the thumb of each cover tab in sequence. Alternatively the tray could be provided with only two tabs instead of four, whereby only one cover tab need be deflected during cover removal. The cover member may be made for example of polycarbonate having a thickness of about 0.030 inches, and the tray member may be stamped and formed from a sheet of anodized aluminum, for example.

The cover tab ends may optionally be shaped to facilitate manual engagement thereof. Variations and modifications may be devised that are within the spirit of the invention and the scope of the claims.

What is claimed is:

1. A splice tray assembly for optical fiber interconnections, comprising:

a tray member having a bottom wall and side walls between opposed tray ends and coextending from said bottom wall to upper edges, and a planar cover member having end portions associated with said tray ends and side edge portions associated with said tray side walls;

said tray member including along each said side wall at least one tray tab proximate a respective said tray end extending from said bottom wall beyond said upper edge of a respective said side wall to an inwardly directed retainer section spaced a selected distance beyond said upper side wall edge; and said cover member including cooperating retainer portions proximate respective said cover end portions and associated with respective said retainer sections to be disposed therebeneath for retention of said cover member to said tray member; and said cover member further including at least one deflectable portion adjacent a said side edge thereof and adjacent said at least one tray tab, protruding at least as far as an outer surface of said tray tab upon assembly to define a stop surface adjacent a tray tab side edge inwardly from a respective said tray end to define cooperating stops at said tray end preventing said cover member to be slid along said tray member toward said tray end, with at least one of said cover member and said tray member adapted to permit manual engagement of said cover side edge adjacent said at least one tray tab to urge a portion of said cover member to an elevation higher than that of said tray tab thus offsetting said cooperating stops, whereby said deflectable cover portion is manually deflectable upwardly to an elevation higher than a respective said retainer section to pass thereover during cover assembly and removal.

2. The splice tray assembly as set forth in claim 1 wherein said tray side walls include inwardly directed flanges along said top edges thereof inwardly of said retainer sections, whereover side edge portions of said cover member rest upon assembly.

3. The splice tray assembly as set forth in claim 1 wherein said tray member includes retainer sections proximate each said tray end along each said side wall thereof.

4. The splice tray assembly as set forth in claim 1 wherein said tray member includes at least one said tray tab proximate each said tray end, and said cover member includes a said deflectable portion proximate each end thereof and providing a said stop surface proximate each said cover end to prevent sliding movement toward either one of said tray ends.

5. The splice tray assembly as set forth in claim 1 wherein said cover member includes a slot adjacent said at least one tray tab upon cover assembly to facilitate upward deflection of said cover portion adjacent said tray tab.

6. The splice tray assembly as set forth in claim 1 wherein said side edge of said cover portion adjacent said at least one tray tab protrudes beyond an outer surface of said tray side wall to facilitate manual engagement thereof to enable deflection of said cover portion.

7. The splice tray assembly as set forth in claim 1 wherein said tray member includes opposing ones of said tray tabs proximate each said tray end, and said cover member includes opposing ones of said cooperating retainer sections proximate each said cover end.

8. The splice tray assembly as set forth in claim 7 wherein said cover member includes a recess along a said cover side edge opposed from each said deflectable portion and adjacent a said tray tab at one said tray end, enabling said cover member to be lifted upon sliding of said cover member after upward deflection of a said deflectable portion a distance sufficient to align said recess beneath said retainer section of said adjacent tray tab and to move said cooperating retainer sections at said other tray end from beneath respective said retainer sections thereat.

9. The splice tray assembly as set forth in claim 1 wherein said cover member includes a cover tab along each said cover side edge spaced inwardly from a respective said cooperating retainer portion to be disposed adjacent a side edge of a respective said tray tab inwardly from a respective said tray end, each said cover tab extending to an end protruding beyond said cover side edge portions a distance such that said cover tabs extend slightly beyond said tray side walls upon assembly for a cover tab side edge to reside adjacent a tray tab side edge inwardly from a respective said tray end to define cooperating stops at each said tray end preventing said cover member to be slid along said tray member, and said cover member including a pair of slots extending inwardly from each said side edge alongside each said cover tab a sufficient distance so that each said cover tab is a cantilever beam.

10. The splice tray assembly as set forth in claim 7 wherein said tray member includes opposing ones of said tray tabs proximate each said tray end, and said cover member includes opposing ones of said cooperating retainer sections proximate each said cover end.

11. The splice tray assembly as set forth in claim 10 wherein said cover member includes a recess along a said cover side edge opposed from each said cover tab and adjacent a said tray tab at one said tray end, enabling said cover member to be lifted upon sliding of said cover member after upward deflection of a said cover tab a distance sufficient to align said recess beneath said retainer section of said adjacent tray tab and to move said cooperating retainer sections at said other tray end from beneath respective said retainer sections thereat.

* * * * *